(12) United States Patent
Livneh

(10) Patent No.: US 9,224,307 B2
(45) Date of Patent: Dec. 29, 2015

(54) METHODS AND SYSTEMS FOR MANAGING A TRAINING ARENA FOR TRAINING AN OPERATOR OF A HOST VEHICLE

(71) Applicant: Elbit Systems Ltd., Haifa (IL)

(72) Inventor: Ofer Livneh, Modiin-Maccabim-Reut (IL)

(73) Assignee: Elbit Systems Ltd., Haifa (IL)

( * ) Notice: Subject to any disclaimer, the term of this patent is extended or adjusted under 35 U.S.C. 154(b) by 7 days.

(21) Appl. No.: 14/094,255

(22) Filed: Dec. 2, 2013

(65) Prior Publication Data

US 2014/0322674 A1 Oct. 30, 2014

(30) Foreign Application Priority Data

Apr. 25, 2013 (IL) .......................................... 225956

(51) Int. Cl.

| | |
|---|---|
| G09B 9/06 | (2006.01) |
| G09B 9/08 | (2006.01) |
| G09B 9/16 | (2006.01) |
| G09B 9/30 | (2006.01) |
| G09B 9/40 | (2006.01) |
| G09B 9/44 | (2006.01) |

(52) U.S. Cl.
CPC .. *G09B 9/08* (2013.01); *G09B 9/16* (2013.01); *G09B 9/302* (2013.01); *G09B 9/40* (2013.01); *G09B 9/44* (2013.01)

(58) Field of Classification Search
CPC .................................. F41A 33/00; F41G 7/006
USPC ..................................................... 434/30, 38
See application file for complete search history.

(56) References Cited

U.S. PATENT DOCUMENTS

| | | | | |
|---|---|---|---|---|
| 5,421,728 A | | 6/1995 | Milden | |
| 5,431,568 A | | 7/1995 | Fey et al. | |
| 5,513,131 A | * | 4/1996 | Wilkinson et al. | ................ 703/8 |
| 5,607,306 A | * | 3/1997 | Bothwell | ........................ 434/29 |
| 5,807,109 A | | 9/1998 | Tzidon et al. | |
| 5,826,206 A | * | 10/1998 | Nemeth | ........................ 701/33.4 |
| 6,106,298 A | * | 8/2000 | Pollak | ............................. 434/29 |
| 6,166,744 A | | 12/2000 | Jaszlics et al. | |
| 6,763,325 B1 | | 7/2004 | Stone | |
| 7,194,353 B1 | * | 3/2007 | Baldwin et al. | ............... 701/528 |
| 7,599,765 B2 | | 10/2009 | Padan | |
| 7,612,710 B2 | | 11/2009 | Lamendola et al. | |
| 7,852,260 B2 | | 12/2010 | Sarafian | |
| 8,068,983 B2 | * | 11/2011 | Vian et al. | ...................... 701/458 |
| 8,241,038 B2 | * | 8/2012 | Quinn et al. | .................... 434/38 |
| 8,616,883 B2 | * | 12/2013 | Wokurka | ........................ 434/35 |
| 2005/0187741 A1 | * | 8/2005 | Gilbert | .............................. 703/2 |
| 2006/0183083 A1 | * | 8/2006 | Moran et al. | .................... 434/11 |
| 2010/0209880 A1 | * | 8/2010 | Leonard et al. | ................ 434/12 |
| 2012/0156653 A1 | * | 6/2012 | Wokurka | ........................ 434/30 |
| 2014/0099606 A1 | * | 4/2014 | Sitnikau | ........................ 434/29 |

* cited by examiner

*Primary Examiner* — Robert J Utama

(74) *Attorney, Agent, or Firm* — Merchant & Gould P.C.

(57) ABSTRACT

A method for managing a training arena for training an operator of a host vehicle includes the procedures of generating a training arena model, updating the training arena model according to gathered real time training arena data, and managing the selected virtual entity for simulating a real entity. The training arena model is updated according to the selected virtual entity data, deriving from the training arena model an operator arena model, producing a representation of the operator arena model. The representation of the operator arena model is presented to the operator and the selected virtual entity is managed according to the training arena model as would have been detected and as could have been perceived by the selected virtual entity were the virtual entities real.

20 Claims, 4 Drawing Sheets

METHODS AND SYSTEMS FOR MANAGING A TRAINING ARENA FOR TRAINING AN OPERATOR OF A HOST VEHICLE

This application claims benefit of Serial No. 225956, filed 25 Apr. 2013 in Israel and which application is incorporated herein by reference. To the extent appropriate, a claim of priority is made to the above disclosed application.

FIELD OF THE DISCLOSED TECHNIQUE

The disclosed technique relates to systems and methods for training an operator of a vehicle, in general, and to systems and methods for managing virtual entities for training an operator of a vehicle, in particular.

BACKGROUND OF THE DISCLOSED TECHNIQUE

Training pilots and aviators can be very costly. Pilots go through hundreds of hours in classrooms, ground based flight simulators and flight training in training aircrafts, for learning, enhancing and maintaining their flight skills. Needless to say that each training flight incurs hefty costs, for example, for the maintenance of the training aircrafts and facilities (e.g., airports), for the required training and maintenance crew, and the like. Therefore, it is imperative that each training flight is fully exhausted, in terms of training value, for maximizing its utility.

It is noted that the term "pilot" refers to a person who directly controls the aircraft, and the term "aviator" is a more general term referring to all crewman involved in operating the aircraft, such as navigators, electronic warfare officers, and the like. Herein below, the terms pilot and aviator may be used interchangeably and both relate to pilots as well as to other aircraft operating crewman.

Training a pilot involves not only teaching the pilot how to control the aircraft but also relates to, for example, teaching the pilot to handle the aircraft in operational activities, to co-operate with fellow pilots (e.g., formation flight) and with other units, and to face opposing pilots and other hostile units. For such training, the trainee pilot should preferably experience flying in formation and flying in the presence of foe pilots (i.e., pilots simulating foe pilots).

As mentioned above the costs associated with flying aircrafts are considerable. For saving some of these costs, the systems of the prior art produce virtual RADAR targets for training a trainee pilot. Other methods described in the prior art for saving costs of training a pilot involve modifying the systems of a relatively inexpensive aircraft (e.g., a training aircraft) to simulate those of a costlier operational aircraft. Thereby, the trainee pilot is trained by simulating the experience of operating the systems of the operational aircraft at lower costs.

U.S. Pat. No. 5,807,109 issued to Tzidon et al., and entitled "Airborne Avionics Simulator System", is directed to an airborne avionics simulation system installed onto a host aircraft, for simulating the avionics of a high performance aircraft. The system includes an input interface, a multifunctional display, an Inertial Navigation System (INS) module, a processor, and a data link module. The input interface reads input from the controllers of the host aircraft. The INS module reads INS data from the INS of the host aircraft. The input interface and the INS module transmit data from the host aircraft into the processor, which generates a simulation of the aircrafts sensors. The processor can further receive GPS data from a GPS sensor, and receive mission\scenario data from a data storage. The data link module communicates with other system installed on other host aircrafts and with ground based stations.

The simulation system simulates the avionics of a high performance aircraft within a low cost host aircraft, such that the trainee pilot flying the host aircraft is provided with simulated flight experience of the high performance aircraft. In particular, the simulation system simulates an avionics system which is lacking in the host aircraft, such as RADAR, as if it was the avionics system of the simulated high performance aircraft. For example, the simulation system can simulate virtual hostile targets, missiles, chaff, flares, and the like. It is noted, however, that the pilot interfaces of the simulated avionics systems are not necessarily the same as those of real avionics systems. For example, the host aircraft does not include the same screens and input interfaces (e.g., buttons, switched, and the like) as an operational aircraft which avionics systems are simulated. The virtual targets are controller according to a set of if-than rules, based on inner variables such as velocity, position, status of armaments, and the like.

U.S. Pat. No. 7,852,260 issued to Sarafian, and entitled "Methods and Systems for Generating Virtual RADAR Targets", is directed at a system for generating virtual RADAR targets. The system includes a transceiver and a controller coupled thereto. The transceiver receives a signal transmitted from a radar antenna and stores the signal information representative of the received signal. The controller receives the received signal and determines an output transmission signal representative of a virtual target. The controller further determines the timing of the transmission of the output signal in response to a virtual distance between the virtual target and the radar antenna, a required virtual target direction and direction information representative of a direction of the radar antenna. The transceiver transmits the output signal such that at least a fraction of the output signal is received by the radar antenna.

U.S. Pat. No. 5,421,728 issued to Milden, and entitled "In-Flight Radar Warning Receiver Training System", is directed at an in-flight Radar Warning Receiver (RWR) training system for use with an RWR. The RWR training system includes formatter, generator and merge operator. The formatter formats real RWR track file reports. The generator generates threat/RWR simulated threat track file data. The merge operator merges the formatted real threat data with the threat/RWR simulated threat track file data. A track file lists the parameters that describe a threat, including physical data (e.g., radar frequency, pulse width, pulse repetition interval) and derived data, determined through analysis of the physical data (e.g., threat type, threat mode). The simulated threat track file data is generated by a threat activity simulator, which simulates threat encounters according to the range of the target aircraft from the trainee aircraft; line-of-sight calculations based on terrain data and radar cross section of the target aircraft; and according to threat modeling for each specific threat type.

U.S. Pat. No. 7,612,710 issued to Lamendola et al., and entitled "Processing Virtual and Live Tracks to Form a Virtual-Over-Live Environment", is directed at a method for merging virtual and live tracks. The method includes the following steps, merging live radar data with virtual radar data, tagging the merged data, determining if the virtual radar data is present and tagging data accordingly. The merged data is tagged with a virtual tag indicator to indicate a presence of the virtual radar data, or tagged with a live tag otherwise. The virtual tag indicator is employed for determining if the virtual radar data is present. The virtual radar data is provided by a pre-determined virtual tagged beam, which origin and manner of production exceed the scope of this publication.

U.S. Pat. No. 5,431,568 issued to Fey et al., and entitled "RADAR Target Generator", is directed at a RADAR target generator. The radar target generator is employed with a radar system including a radar transmitter, a load, a radar receiver, a first transmission line connecting the transmitter and the load, and a second transmission line connecting the load and the receiver. The radar target generator includes a central processor, and a tap. The tap samples a portion of a radar signal traveling through the first transmission line and redirects the sampled portion to the central processor. The processor applies a target signature component to the sampled radar signal portion. The first tap returns the modified radar signal portion to a return radar signal traveling through the second transmission line. The target signature component relates to a pre-determined specific synthesized target type, which is selected by an operator, depending upon the purpose of the operation being conducted.

U.S. Pat. No. 6,166,744 issued to Jaszlics et al., and entitled "System for Combining Virtual Images with Real-World Scenes", is directed at a system for combining virtual targets with real scenes. The system includes a range scanner, a computer model, virtual objects generator, virtual objects combiner, and a display. The range scanner scans the field of interest and generates range data indicating the distance of real-world objects within the field of interest. The computer simulates a virtual entity and produces a virtual image at a location within the field of interest. The generator generates virtual objects. The combiner combines the virtual objects and a real-world image of the field of interest to create a combined image. The display displays the combined image to an observer.

SUMMARY OF THE PRESENT DISCLOSED TECHNIQUE

It is an object of the disclosed technique to provide a novel method and system for managing a training arena for training a trainee operator of a host vehicle. In accordance with an embodiment of the disclosed technique, there is thus provided a method for managing a training arena for training an operator of a host vehicle, the method including the procedures of generating a training arena model, updating the training arena model, deriving from the training arena model an operator arena model, producing a representation of the operator arena model and presenting to the operator the representation of the operator arena model, the training arena model detailing real entities within the training arena, detailing virtual entities within the training arena, and detailing the host vehicle, the training arena model being generated at least according to pre-determined training data, the training arena model being updated according to gathered real time training arena data, the gathered real time training data including virtual entities data, wherein receiving virtual entities data being performed for each selected one of the virtual entities by managing the selected virtual entity for simulating a real entity and updating the training arena model according to the selected virtual entity data, the operator arena model detailing a portion of the training arena as would have been detected by the service systems of the host vehicle were the virtual entities were real, wherein the service systems of the host vehicle and of the real entities are native service systems.

In accordance with another embodiment the disclosed technique, there is thus provided a system for managing a training arena for training an operator of a host vehicle, the training system including a database, at least one service system interface, and a managing processor, the database including pre-determined training data and a training arena model, the training arena model detailing real entities within the training arena, detailing virtual entities within the training arena, and detailing the host vehicle, the at least one service system interface interfaces the training system to a respective native service system of the host vehicle, the at least one real entity interface interfaces the training system to a respective real entity within the training arena, the managing processor generating and updating the training arena model according to gathered real time training arena data, the managing processor deriving from the training arena model an operator arena model, the operator arena model detailing a portion of the training arena as would have been detected by the service systems of the host vehicle were the virtual entities were real, the managing processor producing a representation of the operator arena model, and the managing processor presenting to the operator the representation of the operator arena model.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

Figure 1:
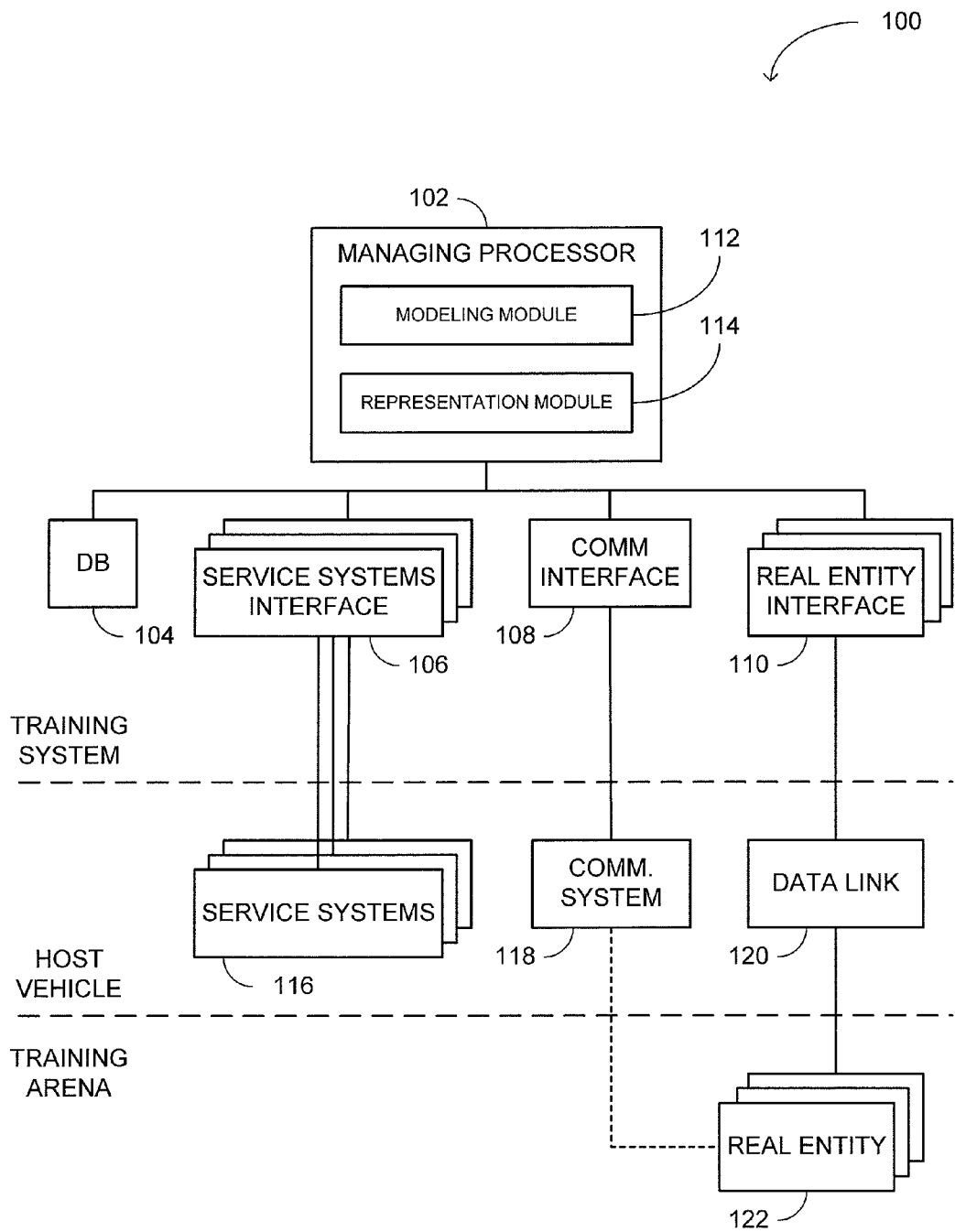
FIG. 1 is a schematic illustration of a system for managing a training arena including virtual entities for training an operator of a vehicle, constructed and operative in accordance with an embodiment of the disclosed technique.

The disclosed technique overcomes the disadvantages of the prior art by providing a system and a method for producing and for managing a training arena including virtual entities for augmenting the training environment of a trainee operator operating a host vehicle. The virtual entities are simulating real entities, thereby augmenting the training arena and the training experience. For example, the virtual entities can simulate vehicles, stations, units, weapons, and any other real entity.

The training arena managing system (also referred to herein below as training system) produces a training arena model detailing the training arena, and continuously updates the training arena model. The training arena model describes the training arena and includes all the data that the training system has about the training arena. The training system employs the training arena model for managing the virtual entities, and for producing to the trainee operator a representation of the training arena.

For example, the training arena model includes data detailing the host vehicle (e.g., the position, trajectory and behavior of the host vehicle, the data gathered by the systems of the host vehicle, and the actions of the trainee operator). The training arena model includes data detailing real entities within the training arena, such as other vehicles, stations or units. The training arena model includes data detailing the virtual entities within the training arena. The training arena model includes data detailing the physical environment of the training arena (e.g., land form data, land cover data, meteorological data, and any other environmental data).

The training system derives from the training arena model, an operator training arena model. The operator training arena model describes the training arena from the perspective of the host vehicle and of the trainee operator. That is, the operator training arena model represents the training arena as would have been detected and presented by the systems of the host vehicle, and as could have been perceived by the trainee operator, if the virtual entities were real.

The training system produces to the trainee operator, a representation of the operator arena model, for presenting it to the trainee operator. The representation presents the training arena to the trainee operator, as would have been presented, if the virtual entities were real entities. The representation includes both the real entities and the virtual entities which would have been detected and presented by the systems of the host vehicle, and as could have been perceived by the trainee operator, if the virtual entities were real.

The training system includes a processor, a memory, and a plurality of interfaces for interfacing with the systems of the host vehicle, the systems of real entities, and with other training arena systems. The processor provides data to and gathers data from the interfaces, and controls their operation. Additionally, the processor can retrieve data from, and store data to the memory.

The training system is coupled with the systems of the host vehicle (i.e., with the native systems installed on the host vehicle, such as sensory systems, navigations systems, communication systems, weapons systems, electronic systems, and the like). The training arena system is further coupled with real entities in the training environment. The training system gathers data from the systems of the host vehicle and from the real entities via respective interfaces. Accordingly, the training system produces the training arena model, the operator arena model and the representation thereof. The training system presents the representation of the operator arena model to the trainee operator via the output of the systems of the host vehicle (e.g., the cockpit displays, the helmet visor and the radio communications system). Additionally, the training system provides data respective of the virtual entities within the training arena to the real entities, such that the real entities could also interact with the virtual entities.

The area of the training arena is determined according to the training scenario and according to the host vehicle. For example, the training arena of a tank would be smaller than that of a bomber aircraft which may cover much greater distances during the training session. The area of the training arena is further determined according to other units besides the host vehicle. For example, an anti-aircraft unit would be considered within the training arena of a host aircraft when the host aircraft enters its missile range, or is detected by its RADAR.

Reference is now made to FIG. 1, which is a schematic illustration of a system, generally referenced 100, for managing a training arena including virtual entities for training an operator of a vehicle, constructed and operative in accordance with an embodiment of the disclosed technique. Training arena management system 100 (i.e., also referred to herein as training arena system 100 or simply training system 100) is installed within a host vehicle (not shown) for training an operator of the host vehicle. Alternatively, training arena system is external to the host vehicle and is installed on a different platform, having a data channel with the host vehicle, such as another vehicle or an immobile station.

In the description herein below, the host vehicle of the training arena system is an aircraft, and accordingly the trainee operator of the host vehicle can also be referred to as a trainee pilot. However, it is noted that the training arena system can be installed within any other host vehicle, such as a land vehicle or a marine vehicle, and can be installed on other platforms, whether mobile or immobile, such as towers or batteries. Thus, the training system can be employed for training an operator of any manned vehicle or station. For example, the host vehicle can be a fighter aircraft, a tank, a submarine, a missile-boat, a helicopter, a control tower, a gun battery, and the like.

The term "aircraft model", as detailed herein below relates to the type or class (i.e., a model) of an aircraft, as opposed to a specific aircraft of that model. For example, McDonnell Douglas F-15 Eagle is an aircraft model. An air force can hold many aircrafts, belonging to the F-15 model. The host aircraft is of a specific aircraft model, and therefore includes the systems associated with that specific aircraft model (i.e., also referred to herein as native systems of the host aircraft).

For example, in case the host aircraft is a fighter aircraft, the host aircraft may include the following native service systems: Inertial Navigation Systems (INS), Electronic Warfare (EW), such as RADAR Warning Receiver (RWR) system, and Electronic Counter Measure (ECM) systems (i.e., both together referred to as EW systems herein below), Fire-Control RADAR (FCR) system, Identification Friend or Foe interrogator (IFF), observing system, targeting pod, and missile systems. Thus, the trainee pilot is trained for operating the aircraft model, and in particular the service systems, which he would employ for operational activities. The host aircraft can either be dedicated solely for training missions or employed for both training and operational missions. In summary, the service systems of a vehicle (or a unit or station) are the systems employed by that vehicle for performing the activities thereof. For example, a RADAR station has RADAR systems and communication systems, a tank has navigation, weapons and communication systems.

Training system 100 includes a managing processor 102, a database 104, a plurality of service systems interfaces 106, a communication systems interface 108, and a plurality of real entities interfaces 110. Managing processor 102 includes a modeling module 112 and a representation module 114.

Service systems interfaces 106 are coupled with the service systems of the host aircraft, such as the INS, the Global Positioning Systems (GPS), the EW systems, the weapons systems, the helmet system of the trainee pilot, and the sensory systems of the host aircraft. It is noted that, training system can be coupled (via respective interface) with all of the service systems of the host aircraft, or only with some of the service systems.

Communication systems interface 108 is coupled with communications systems 118 of the host aircraft, such as the radio communication systems. Real entities interfaces 110 are coupled with real entities 122 in the training environment, via a data link 120 of the host aircraft. As can be seen in FIG. 1, the drawings is separated by dotted lines into three portions, the top portion depicting the components of the training system (e.g., installed within the host vehicle), the middle portion depicting the native components of the host vehicle, and the bottom portion depicting the real entities which are within the training arena.

Managing processor 102 is a processing device which controls the operation of training system 100. Managing processor 102 can either be a single processing device or a plurality of processing devices working in unison. In case managing processor 102 is composed of a plurality of managing processors, the managing processors can be located next to each other or be distributed in the host vehicle (e.g., a managing processor for each service system interface). Managing processor 102 receives data from the interfaces and databases of training system 100 and accordingly manages the training arena including the virtual entities for training the trainee pilot of the host aircraft. In addition, managing processor 102 provides data respective of the virtual entities to real entities 122, via real entities interfaces 110, so that real entities 122 can interact with, and react to, the virtual entities. In this manner, training arena system 100 and real entities 122, together, produce the training arena for training the trainee pilot.

As mentioned above, managing processor 102 includes two modules, a modeling module 112 and a representation module 114. Modeling module 112 produces a training arena model (not shown) describing the training arena, and continuously updates the training arena model.

The training arena model includes data detailing the physical environment of the training arena, such as geographic and topographic data (e.g., land form data and land cover data), weather data (e.g., barometric pressure, wind conditions, precipitation condition and other meteorological data), day and night and seasonal cycles, sun position, clouds position, and the like. To sum it up, the physical environment data can include any aspect of the physical environment which may affect the operation of the systems of the entities (i.e., both virtual and real including the host vehicle) within the training arena, or may affect the operators (e.g., pilots) of the systems. Thus, for example, rain may affect RADAR reads, and sun rays may blind a pilot looking at them.

The training arena model includes data detailing the host vehicle. The data detailing the host vehicle includes data gathered by the service systems of the host vehicle, data detailing the actions of the trainee operator, and includes data detailing the behavior of the host vehicle, as would be detailed further herein below. The data gathered by the service systems of the host vehicle includes data gathered via the sensors of the service systems and data received from external systems via the communications systems of the host vehicle such as the radio communication system or the data link. The training arena model further includes data detailing the real entities. The data detailing the real entities includes data gathered by the service systems of the real entities, and includes data detailing the behavior of the real entities, as would be detailed further herein below. The training arena model further includes data detailing the virtual entities. The data detailing the virtual entities includes data detailing the behavior of the virtual entities, data detailing what would have been detected by the service systems of the virtual entities if the virtual entities were real, and data that could have been perceived by the operators of the virtual entities if they were real. It is noted that data detailing the behavior of an entity (i.e., whether virtual or real, including the host vehicle) includes data describing the position of the entity, its trajectory, its actions, and its communications.

Modeling module 112 produces and updates the training arena model further according to predetermined training data. The predetermined training data includes data detailing the performance envelope and capabilities of virtual entities which might be produced during the training session, and their operational doctrines. The predetermined training data can further include data detailing training scenarios, such as a bombing mission or an air support mission. For example, the training scenario data can include data about what foe units might be encountered (e.g., might be produced as virtual foe entities). It is noted however, that the training system dynamically manages the training session according to the actions of the entities (i.e., virtual and real including the host vehicle) and not according to a strict predetermined scenario.

Modeling module 112 derives from the training arena model other models, such as operator training arena model and a virtual entity arena model. The operator training arena model (also referred to as the operator arena model) describes the training arena from the perspective of the host vehicle and of the trainee operator. That is, the operator arena model represents the training arena as would have been detected by the systems of the host vehicle if the virtual entities were real. In other words, the operator arena model includes all data that would have been gathered by the systems of the host vehicle if all the entities were real. Additionally, the operator arena model includes all sensual data which could have been perceivable by the trainee operator if all entities were real.

Similarly, a virtual entity arena model represents the training arena as would have been detected by the service systems of the virtual entity and as could have been perceived by the operator of the virtual entity, if the virtual entity, its operator, and all the virtual entities were real entities. Modeling module 112 produces a respective virtual entity arena model for each virtual entity managed by managing processor 102. Processor 102 manages a virtual entity according to its respective virtual entity arena model.

For example, in case a virtual aircraft is positioned in proximity to another aircraft (i.e., whether real or virtual), the virtual operator of the virtual aircraft could have seen the nearby aircraft via the cockpit window, and not only via the output interfaces of the service systems. The virtual operator might have acted differently when seeing the nearby aircraft via the cockpit window and not only via the output interfaces. Therefore, the virtual entity arena model includes data that could have been perceived by the operator of the virtual entity, if the virtual entity, its operator, and all the virtual entities were real entities. In this manner, a virtual entity simulates a real entity by being managed according to a respective virtual entity arena model.

Representation module 114 produces a representation of the operator arena model for presenting to the trainee operator. The representation represents the training arena as would have been detected by the service systems of the host vehicle (i.e., and as would have been received from external systems via the communications systems, such as the data link) if the virtual entities were real entities. Representation module 114 incorporates the representation into the service systems of the host vehicle (i.e., via the respective interfaces). Thereby, the representation is presented to the trainee operator via the systems of the host vehicle (e.g., via visual interfaces such as the helmet visor and visual displays, via auditory interfaces such as earphones and speakers, and via tactile interfaces). The representation is dynamically updated and modified. For example, the representation can change according to the Line Of Sight (LOS) of the trainee operator, such that images of virtual entities are only incorporated onto the helmet visor display when the operator is looking at the direction of the virtual entity.

For example, a virtual aircraft approaches the host vehicle at some angle. If the approaching virtual aircraft was real, the trainee operator might have observed it when looking at its direction. Thus, when producing a representation of the operator arena model, an image of the approaching aircraft can be injected onto the visor display of the trainee operator when looking in the direction of the virtual aircraft.

Service systems interfaces 106 are a plurality of interfaces coupled with service systems 116 of the host aircraft. For example, the service systems can include the navigation systems, the RADAR system, the EW systems such as the Radar Warning Receiver (RWR) system, the Missile Warning System (MWS) and the Electronic Counter Measures (ECM) system, the IFF interrogator, the weapons systems, the surveillance pod, the helmet system of the trainee pilot, the observing system, the targeting pod, the missile systems and the like (all not shown). As mentioned above, service system interfaces 106 interface with the systems of the host aircraft, and can extract data therefrom, and inject data thereinto. Thereby, a service system interface 106 gathers data for training system 100 from the respective aircraft system, and incorporates the representation of the operator training arena model into the respective aircraft system.

The data extracted from service systems 116 can relate to the actions of the trainee pilot, such as locking a weapon, using an EW system, changing RADAR scan modes, looking into a specific direction (e.g., by employing a helmet Line Of Site (LOS) detector) and the like. Additionally, the data extracted from service systems 116 can relate to data detected or received by the respective service system, such as the behavior of real entities 122 (i.e., as detected by service systems 116), or the conditions of the of the training environment (e.g., the barometric pressure as detected by service systems 116).

Service systems interfaces 106 are coupled, for instance, with the controls of each of service systems 116 for receiving control input data respective of the operations of the trainee pilot operating service systems 116, and with the output of service systems 116 for receiving output data from the service systems. It is noted that the output of service systems 116 can be an output outputting data to the trainee operator, or an output to another one of service systems 116 (i.e., a subsequent system). For example, the output can be the visual RADAR display, or can be a data line providing the barometric pressure as detected by a barometer to the INS.

Herein are a few examples, of the systems of the host aircraft which are interfaced with training arena system 100. A navigation system interface 106 interfaces processor 102 with the navigation systems of the host aircraft, such as an INS and a GPS, for receiving trajectory data respective of the host aircraft.

A RADAR system interface 106 is coupled with the RADAR system of the host aircraft. The RADAR interface extracts data respective of the RADAR emissions and RADAR receptions of the RADAR system and provides that data to processor 102. Alternatively, the RADAR interface provides to processor 102 only output data of the RADAR system of the host aircraft, by tapping into the output line between the RADAR system and the RADAR output interface. Additionally, the RADAR interface can incorporate the representation of the operator training arena model into the RADAR system of the host aircraft, as detailed further herein below with reference to FIGS. 3 and 4.

For example, when the RADAR of the host aircraft detects a distant formation of entities, at first the formation may look like a single body. As the host aircraft and the formation of entities get closer, or in case the RADAR scans a narrower sector thereby increasing its resolution, the presentation of the formation of entities on the RADAR screen is separated into the individual entities. In case the formation includes at least one virtual entity, training system 100 incorporates the virtual entities into the output of the RADAR as if they were real. That is, the virtual entities appear as part of the single body at a low resolution scan, and as a separate entity at a higher resolution scan. In accordance with another example, training system 100 can simulate RADAR jamming performed by a virtual foe entity. Alternatively, training system can simulate RADAR distortions due to weather conditions, such as heavy rains and thunderstorms.

In accordance with another example, a real entity is positioned on one side of the host aircraft and is visibly detected by the RADAR of the host aircraft. When the RADAR system of the host aircraft is in a Track While Scan (TWS) mode, the scan sector is affected by the number of tracked targets (i.e., the scan sector is reduced as the number of tracked targets increases). In case a virtual entity is positioned on the other side of the host aircraft and its representation is viewed on the RADAR screen, the real entity would not be shown on the RADAR screen, as if the virtual entity was a real one. Therefore, training system 100 would only present the virtual entity to the trainee pilot, and not the actually detected real entity.

A weapons interface 106 is coupled with the weapons systems of the host aircraft, for example, a weapons pod including a visual sensor (i.e., a camera). The weapons interface 106 extracts data respective of the input of the trainee pilot, and the input of the sensors associated with the weapons systems, and respective of the status of the weapons systems. For example, the camera of the weapons pod acquires images of real ground targets. Training system 100 produces and manages virtual ground targets, and incorporates a representation thereof into the output of the weapons pod on the display such that it would display both the real and virtual entities. Processor 102 employs the data detected by the weapons pod for making the virtual entities appear as real to the trainee pilot. For example, processor 102 receives a Forward Looking Infra Red (FLIR) image of a real ground unit, and employs it to produce a simulated FLIR image including both the real ground unit and an additional virtual ground unit. The virtual ground unit would appear as real to the trainee pilot, based on the characteristics (e.g., intensity) of the imaged real ground unit.

Additionally, training system 100 reacts to actions of the trainee pilot for managing the training arena. For instance, in response to the input from the trainee pilot for launching a missile (i.e., detected by weapons interface 106), training system 100 shall generate a virtual missile. The virtual missile behaves as if it was a real missile, and both real and virtual entities can react to the launched virtual missile as if it was a real missile. In particular, training system 100 provides data respective of the virtual missile to real entities 122 such that the operators of real entities 122 could react to the virtual missile as if it was real. Training system 100 can further terminate a virtual target which was annihilated by the virtual missile fired by the trainee pilot, and eliminate the annihilated virtual entity from the display. Training system 100 can simulate the visual effects of a weapon hitting that virtual entity such as a blast and smoke.

A helmet interface 106 is coupled with the helmet system of the trainee pilot. The helmet system includes a visor through which the pilot is looking, and a projector for projecting data onto the visor. The helmet system further includes a LOS detector for detecting the direction at which the pilot is looking. Managing processor 102 receives the LOS direction from helmet interface 106, and provides simulated image to the helmet projector for projecting onto the visor, such that the pilot could see the simulated image. The simulated image corresponds to the LOS of the operator and is changed when the operator is looking in different directions. Alternatively, the helmet system includes a helmet image processor, which receives data and produces the image projected onto the helmet visor. In such a case, managing processor only provides data respective of the representation of the operator arena model to the helmet image processor and does not produce the image to the visor projector by itself.

Communication interface 108 interfaces processor 102 with communication system 118 of the host aircraft. For example, managing processor 102, via communications interface 108, receives radio communications sent and received by a radio communications system of the host aircraft. Additionally, processor 102 provides radio communications system 118 with virtual radio communications simulating radio communications of virtual entities. Radio communications system 118 outputs the simulated radio communications to the trainee pilot, as if they were real radio communications from a real entity. For example, a virtual entity playing a subordinate formation member of the trainee pilot could follow the orders issued by the trainee pilot, and could verbally report its actions to the trainee pilot. Training system 100 can further simulate communications jamming performed by a foe virtual entity, or communications distortions caused by virtual weather conditions.

Processor 102 and communication interface 108 perform two functions with respect to radio communications system 118, interpreting the radio communications of the trainee pilot and of real entities 122, and generating radio communications simulating radio communications of virtual entities. Interpreting the real radio communications is performed by employing, for example, speech to text techniques. Modeling module 112 employs the data extracted from real radio communications for updating the training arena model and accordingly the derived operator arena model and the virtual entities arena models. Radio communications simulating radio communications of virtual entities are generated, for example, by employing text to speech techniques. Representation module 114 generates radio communications which could have been communicated by the virtual entities if they were real, and radio communication interface 108 incorporates these simulating radio communications into the communications system 118.

The simulating radio communications are only provided to relevant entities. For example, an entity playing a foe vehicle, whether real or virtual would not receive radio communications of the trainee operator (i.e., as it should not be coupled to the radio network of the host vehicle). The simulating radio communications can either be broadcasted via the radio communications system, or can be provided to real entities via the data communication link and presented to the operators of the real entities by a colleague training system as if they are radio communications.

Processor 102 provides to the interfaces of training arena system 100 data respective of the representation produced by representation module 114 representing the operator arena model. Each interface incorporates the representation into the respective one of service systems 116 of the host aircraft. Training system 100 produces the representation such that the virtual entities simulate real entities. That is, the virtual entities are presented to the trainee pilot only in case they would have presented if the virtual entities were real. In addition the virtual entities are presented such that they appear to the trainee pilot as if they were real entities. Alternatively, system 100 can inject the virtual entities such that they are marked, so the trainee pilot would be able to distinguish them from real entities. It is noted that, regardless of the manner in which the virtual entities are presented to the trainee pilot, processor 102 manages the behavior of the virtual entities to simulate the behavior of real entities.

Training system 100 can incorporate the representation of the operator training arena model to each of service systems 116 of the host aircraft, such as the RADAR, the EW, the IFF interrogator, the data-link, the pilot helmet system, and the targeting pod. Additionally, training system 100 can incorporate the representation of the operator training arena model onto the cockpit windows of the host aircraft by employing a video generator and a projector (both not shown). The interface of training system 100 with service systems 116 of the host aircraft is detailed further herein below with reference to FIGS. 3 and 4.

Real entities interface 110 is coupled with real entities 122. In accordance with a first embodiment of the disclosed technique, real entities interface 110 is coupled with other training systems installed on real entities 122 (i.e., colleague training systems), which in turn are coupled with the service systems of the respective real entity. In accordance with a second embodiment of the disclosed technique, in case a real entity does not include a colleague training system, real entities interface 110 is coupled with the service systems of that real entity (e.g., RADAR systems of the real entities). It is noted that some real entities are not coupled with the managing processor, and can be coupled with the host vehicle or with other real entities via communication systems or not coupled at all. These real entities are not actively participating in the training session. Naturally, these real entities, positioned within the training arena area, may be detected by the service systems of the host vehicle and of other real entities. The training system can either omit these non-participating real entities from the training arena model, and the derived models, or can keep them as neutral entities.

Real entities interface 110 is communicating with the respective one of real entities 122 via a native data link (not shown) of the host aircraft and of the respective real entity. Alternatively, real entities interface 110 can communicate with a respective one of the real entities via a dedicated data link, or via the radio communications system (i.e., encoding data onto dedicated radio transmissions).

It is noted that the communications systems of the host aircraft may be coupled with the communication systems of real entities 122 (e.g., the radio communications systems and the native data link), regardless of real entities interface 110. That is, real entities 122 can be coupled with the host aircraft via the radio communication system for sending radio communications between the operators, and via real entities interface 110 for communicating training session data and virtual entities data.

Real entities 122 are real vehicles (e.g., airborne, land or marine vehicles), units (e.g., a ground anti-aircraft unit) or stations (e.g., a ground RADAR station) which are participating in the training session of the trainee pilot of the host aircraft, or which are located within the area of the training arena. For example, a unit can be defined as within the training arena when the host aircraft is within the range of the unit (e.g., missile range or RADAR range), when the unit is within the range of the host aircraft, or when the unit is within a specified area which is defined as part of the training arena. Each of real entities 122 can "play" a friendly entity, a foe entity or a neutral entity. The neutral entities can pose a dilemma for the trainee pilot (i.e., whether to bomb an anti-aircraft unit positioned close to a civilian hospital).

Managing processor 102 communicates with real entities 122 (i.e., via real entities interface 110), receiving data therefrom and providing data thereto, for synchronizing the training arena between the host aircraft and real entities 120. For example, in case a virtual entity aircraft is shot down, processor 102 would notify real entities 122 so that they may eliminate the shot down aircraft from the training arena as outputted to their respective operators. Furthermore, processor 102 receives from real entities 122 data gathered by the service systems of real entities 122. For example, a real entity can provide data respective of itself, of other real entities as detected by its systems, and of virtual entities managed by a colleague training arena system installed thereon.

Processor 102 employs the data received from real entities 122 for updating the training arena model, and accordingly the derived operator arena model and virtual entities models, and for updating the representation of the operator arena model. It is noted that managing processor 102 communicates with real entities 122 and not with the operators of real entities 122. That is, managing processor 102 provides data respective of the virtual entities to other such managing processors installed on real entities 122 (i.e., colleague managing processors), or directly to the service systems of real entities 122. The operators of real entities 122, on the other hand, receive data respective of the training arena from the output interfaces of real entities 122, such as the visual displays and the radio communication systems.

As detailed above, the trainee pilot is trained at operating the systems of the host aircraft (i.e., and not simulated systems). That is, the systems are real, but the training arena system manipulates the output (i.e., either directly or by manipulating the input) of the real systems to incorporate virtual entities into the training environment. In this manner, the training arena system can simulate units, and can also simulate actions and weapons. For example, in case the trainee pilot launches a missile against a virtual foe aircraft, the launching operation can be simulated. In response to respective input of the trainee pilot (i.e., operating the weapons systems of the host aircraft), the training arena system can produce a virtual entity simulating the launched missile, instead of actually launching the real missile.

In accordance with an alternative embodiment of the disclosed technique, the training system can manipulate the output of the service systems for simulating service systems having different capabilities. For example, in case the RADAR of the host system can lock on targets within a range of 10 kilometers. The training systems can simulate RADAR locks on targets within a range of 30 kilometers, for evaluating the utility of such long locking range RADAR system, before purchasing such system.

The operation of training system 100 is detailed herein. Modeling model 112 of processor 102 retrieves predetermined training data from database 104 and produces a training arena model. Modeling model 112 continuously updates the training arena model according real time data gathered by its interfaces from service systems 116, from communication system 118 and from real entities 122. Additionally, modeling module 112 updates the training arena model according to data respective of the virtual entities as generated by processor 102. Modeling model 112 further produces and updates an operator training arena model derived from the training arena model, and virtual training arena model for each virtual entity managed by processor 102.

Processor 102 employs a virtual entity arena model for managing the respective virtual entity. The virtual entity arena model describes the training arena from the perspective of the virtual entity. That is, the virtual entity arena model includes data which would have been detected by the virtual entity if all the virtual entities were real. Processor 102 manages the virtual entity for simulating a real entity, and manages it such that it reacts to the virtual entity arena model as a real entity would have. The virtual entity interacts with the real entities, including the host vehicle, and with other virtual entities. In particular, the training system manages the virtual entity according to data which would have been gathered by its service systems and according to data which could have been perceived by its operator. For example, in case of a non-manned virtual entity, the training system simulates its behavior according to data it would have detected and according to its operational algorithm (e.g., heat seeking missile). In case of a manned virtual entity (e.g., a virtual fighter aircraft), the training system simulates its behavior according to data the virtual pilot could have perceived from the service systems of the virtual aircraft and from its surrounding environment, and according to appropriate operational doctrines.

For example, a virtual entity simulating a subordinate formation member, would follow verbal orders of the trainee pilot, and would try to evade RADAR locks of virtual foe aircrafts. A virtual entity would send via the data link data respective of entities detected by its RADAR, as a real entity would have (i.e., processor 102 simulates such behavior). That is, in case a virtual entity "plays" a formation member of the trainee pilot, and would have detected a foe entity if it were real, processor 102 would simulate the data which should have been sent by the virtual entity. In this manner, for example, processor 102 modifies the operator arena model according to data received from the virtual entity (i.e., according to data that processor 102 simulates as provided by the virtual entity).

It is noted that processor 102 manages each of the virtual entities according to its respective virtual entity arena model, and does this for all the virtual entities simultaneously. Thereby, each virtual entity is managed according to data which would have been available to it if it, and all other virtual entities, were real, thereby simulating the behavior of a real entity.

Representation module 114 produces and updates a representation of the operator training arena model for presenting to the trainee operator. Representation model 114 incorporates the representation into services systems 116 and communication systems 118, as detailed further herein below with reference to FIGS. 3 and 4. The representation of the virtual entity presents the training arena of the trainee operator as it would have been if the virtual entities were real. For example, when a virtual entity, simulating a foe aircraft, locks its RADAR on the host aircraft its RADAR cross section is increased. Thereby, the virtual entity is detected more easily by the RADAR of the host aircraft.

In accordance with another example, in case the virtual entity is a missile fired by a foe aircraft, the representation would relate to the position of the virtual missile, its trajectory and speed, and its RADAR cross section. The interface of the missile warning system (MWS) of the host aircraft would present the virtual missile in the MWS output. In case the trainee pilot performs an evasive maneuver, modeling module 112 receives from the navigation systems of the host aircraft data respective of the maneuver of the host aircraft, and updates the training arena model accordingly. Modeling module 112 updates the virtual entity arena model of the virtual missile according to the maneuver of the host vehicle, and processor 102 manages the virtual missile according to its updated virtual entity model describing the evading host vehicle. Processor 102 generates data describing the behavior of the virtual missile, and modeling module 112 updates the training arena model, and the operator arena model, accordingly. Representation model 114 updates the representation of the virtual missile on the outputs of service systems 116.

In case the virtual missile was fired at one of real entities 122 playing as a formation member of the trainee pilot, the real formation member would also perform an evasive maneuver, and would report via radio communications to the trainee pilot. Processor 102 receives data respective of the maneuver of the real formation member from the RADAR of the host aircraft, from the navigation systems of the real formation member (e.g., via the data link and via real entities interface 110), from the RADAR of another real entity, or from a combination thereof, and the virtual missile would react to that maneuver as well.

The training arena of the disclosed technique is managed either in a centralized manner by a central system, or in a distributed manner by a plurality of systems (i.e., colleague training systems). In the central configuration, the central training system manages the virtual entities, produces the training arena model and the derived models for each of the host vehicles and for each of the virtual entities, and provides data respective thereof to local systems installed on host vehicles for producing a representation of the respective host arena model. Alternatively, the central training system only manages the virtual entities, or at least some of the virtual entities, and provides data respective thereof to the local systems for producing respective arena models. In the central configuration, the central training system reduces the computational resources required by the local systems installed on the host vehicles. It is noted that the central training system can be installed on an immobile station (e.g., control tower), or on a vehicle (e.g., a control vehicle, such as an Airborne Early Warning And Control (AEW&C) aircraft, or the host vehicle itself).

In a distributed configuration, each training system is installed on a different platform (e.g., vehicle or station). In the distributed configuration, each system can manage different virtual entities, and the systems can pass the management of a virtual entity from one to the other. It is noted that in the distributed configuration, a selected training system which manages selected virtual entities provides data respective of those virtual entities to other training systems such that they would include the selected virtual entities in their own training arena model, and derived models. In this manner, the distributed training systems share the computational load of managing the training arena.

For example, in case a first managing processor produces a new virtual entity, such as a launched missile. The producing managing processor updates the other processors about the new virtual entities, such that the other processors can incorporate the new virtual entity into their own training arena model. The producing managing processor can either manage the new virtual entity throughout its existence, or it can let another managing processor take over control of the new virtual entity when necessary (e.g., when the new virtual entity is closer to the other processor than to the producing processor, or when the producing processor handles a large number of entities which consume too much computational resources).

In accordance with an embodiment of the disclosed technique, the training arena model and the operator arena model can be recorded for later analysis of the training session. Additionally, representation of the operator arena model can be sent in real time to a control station, in which an instructor of the trainee operator receives the same representation. The instructor can evaluate the performance of the trainee operator according to the representation of the operator arena model, and can provide feedback to the trainee pilot, in real time.

Figure 2A:
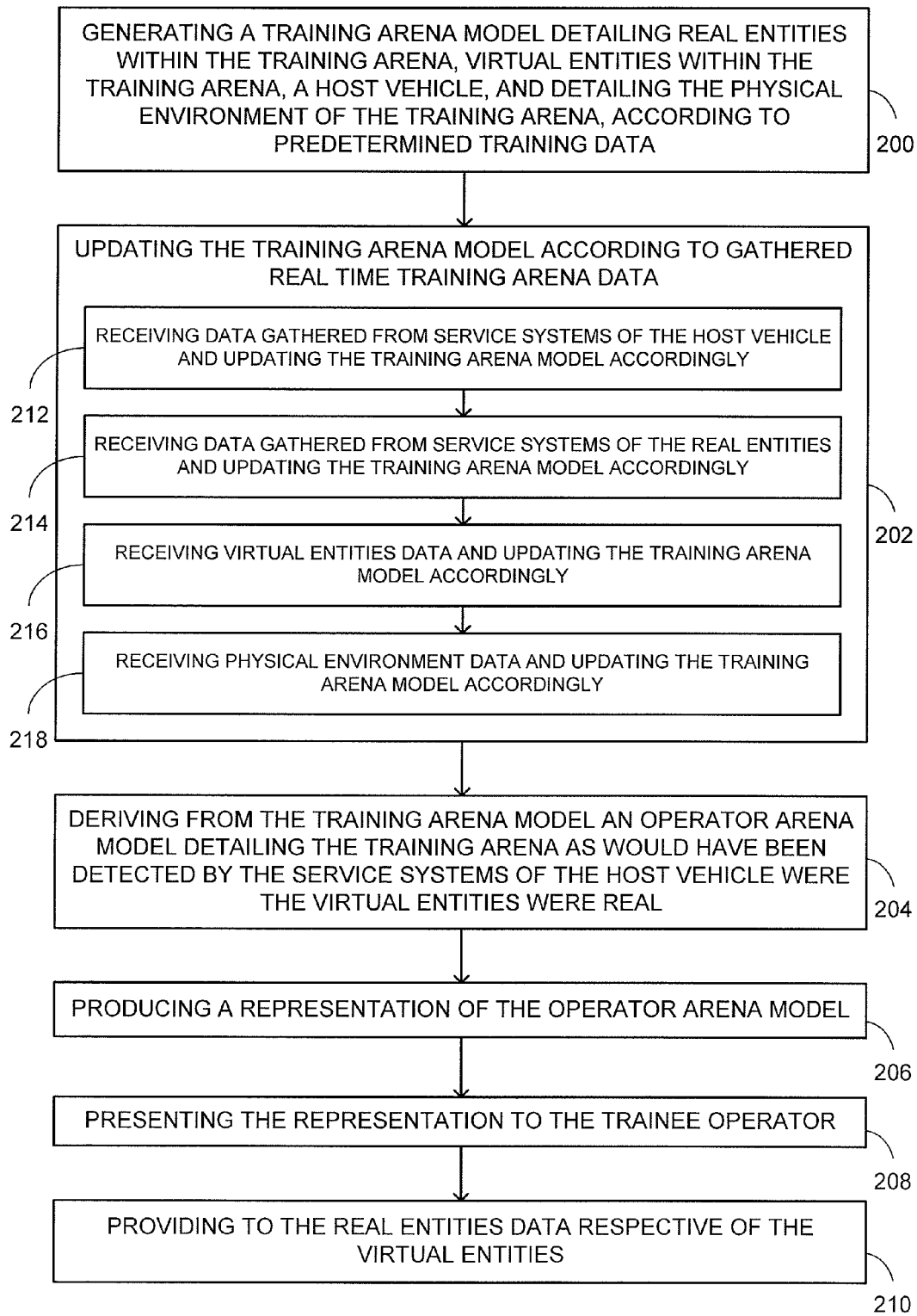
FIG. 2A is a schematic illustration of a method for managing a training arena including virtual entities for training a trainee operator of a host vehicle, operative in accordance with another embodiment of the disclosed technique.
Figure 2B:
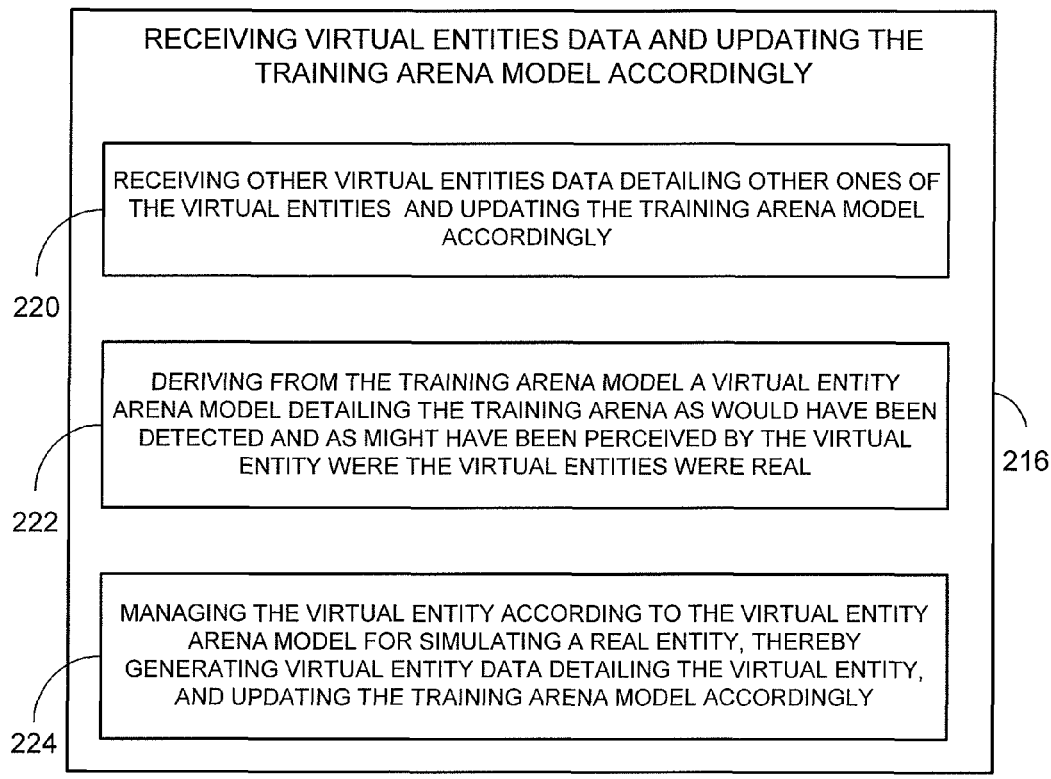
FIG. 2B is a schematic illustration of the sub-procedures of the procedure of receiving virtual entities data and updating the training arena model accordingly, of FIG. 2A.

Reference is now made to FIGS. 2A and 2B. FIG. 2A is a schematic illustration of a method for managing a training arena including virtual entities for training a trainee operator of a host vehicle, operative in accordance with another embodiment of the disclosed technique. FIG. 2B is a schematic illustration of the sub-procedures of one of the procedure of FIG. 2A of receiving virtual entities data and updating the training arena model accordingly. As mentioned above the host vehicle in the example set forth in FIGS. 1-4 is a host aircraft, and the trainee operator is a trainee pilot. The trainee pilot is trained as a pilot of the host aircraft, including operating the systems of the host aircraft and reacting to the presented operator arena model.

For example, in case the host aircraft is a Sikorsky CH-53 transport helicopter. The host aircraft would include systems associated with this model (i.e., Sikorsky CH-53), such as EW systems, navigation systems, and the like. Thereby, the method enables training the trainee pilot, for example, for operating the aircraft the pilot would employ during operational activity.

In procedure 200, a training arena model is generated. The training arena model is generated at least according to predetermined training data. The training arena model is data representing the training arena, and detailing all aspects of the training arena, such as the entities within the training arena (i.e., virtual and real including the host vehicle) and their behavior, the physical environment of the training arena.

The predetermined training data includes data relating to the performance envelope, the capabilities, and the operational doctrines of real entities which may be simulated by virtual entities during the training session. The predetermined data includes data relating to the physical environment of the training arena, such as land form data, land cover data, and Digital Terrain Elevation Data (DTED). The predetermined data can include data relating to the initial state (e.g., position) of virtual entities, such as bombing targets at a bombing training session. To sum it up, the predetermined data can include all data which might be required for managing the training arena and which cannot be determined in real time during the training session, or which can be predetermined for saving computational resources.

With reference to FIG. 1, training arena management system 100 produces a training arena model according to predetermined training data. In particular, modeling module 112 of processor 102 produces the training arena model at least according to predetermined training data stored on database 104.

In procedure 202, the training arena model is updated according to gathered real time training data. The real time training arena data is data gathered from a variety of sources, and which is employed for updating the training arena model. Real time data is gathered, and the training arena model is updated, continuously for reflecting the current state of the training arena including all entities (i.e., both real and virtual). Procedure 202 includes four sub-procedures 212, 214, 216 and 218.

In procedure 212, data gathered from the service systems of the host vehicle is received and the training arena model is updated accordingly. The data gathered from the service systems of the host aircraft relates to the data detected by the sensors of the service systems and to data gathered from the input interfaces of the service systems and relating to the actions of the trainee operator. it is noted that the data gathered by the service systems of the host vehicle includes data received via the communications systems of the host aircraft, such as radio communications and data received via the data link, from other entities. With reference to FIG. 1, modeling module 112 receives data gathered from service systems 116 via service system interfaces 106, and updates the training arena model.

In procedure 214, data gathered from the service systems of the real entities is received and the training arena model is updated accordingly. The data gathered from the service systems of the real entities can include data detected by the sensors of the service systems and data gathered from the input interfaces of the service systems and relating to the actions of the operators of the real entities. With reference to FIG. 1, modeling module 112 receives data gathered from real entities 122 via real entities interfaces 110, and updates the training arena model.

In procedure 216, virtual entities data is received and the training arena model is updated accordingly. Virtual entities data details the behavior of the virtual entities, including, for example, their position, trajectory, actions (e.g., RADAR locks), and communications. The virtual entities data is produced by training system 100 according to the training arena model, and in particular is produced for each virtual entity according to its respective virtual entity arena model. It is noted that the virtual entities data is produced by the training system which manages the respective virtual entities. The training system which manages the respective virtual entities can either be the training system installed on the host vehicle or another training system, such as a colleague training system installed on another host vehicle or a central training system managing the training arena. Procedure 216 and the production of the virtual entities data is detailed further herein below with reference to FIG. 2B.

Virtual entities can be, for example, friendly units (e.g., ground, marine or airborne units), foe units (e.g., a missile launched on the host aircraft), and neutral units (e.g., civilian aircrafts). Additionally, the training system can simulate living creatures (e.g., a flock of geese), weather conditions (e.g., managing the RADAR output as if there were heavy rains), or other conditions. To sum it up, the training system simulates any entity required for training the trainee pilot. The training system enriches the training environment of the trainee pilot, and enables the trainee pilot to train in situations which may be difficult or costly to reproduce otherwise.

It is noted that when the training arena management system produces the virtual entities data, it can also produce new virtual entities and eliminate existing virtual entities according to the developments of the training session. For example, when the trainee operator operates the controls of the weapons systems of the host vehicle, the managing processor can simulate the firing of the weapons. In case a virtual foe aircraft is shot down by the host aircraft, the training arena system terminates the virtual entity of the shot down aircraft and eliminates its representation from the systems of the host aircrafts.

In procedure 218, physical environment data is received and the training arena model is updated accordingly. The physical environment data includes, for example, the position of the sun and of clouds, the weather conditions, such as winds and rain, the visibility conditions, and the like. The physical environment data can be received from different sources, including meteorological stations, sensors of the host aircraft and of other real entities, and the like.

All the data gathered, as detailed in each of sub-procedures 212-218, is referred to together as training arena real time data, and is employed by the training arena management systems for updating the training arena model. With reference to FIG. 1, modeling module 112 receives real time training arena data from the host vehicle (e.g., data gathered by service systems 116), from real entities 122 (e.g., data gathered by the service systems of the real entities) and from processor 102 (e.g., virtual entities data), and accordingly updates the training arena model.

In procedure 204, an operator arena model, detailing the training arena as would have been detected by the service systems of the host vehicle if the virtual entities were real, is derived from the training arena model. The operator arena model represents the training arena from the perspective of the host vehicle and the trainee operator. For example, in case there are clouds between the trainee operator and an entity, that hidden entity is not visible to the trainee operator, and the operator arena model would reflect that. Continuing with the same example, the hidden entity may be detected by the RADAR of the host vehicle, and should therefore appear on the RADAR display, but should not appear via the operator's visor. The operator arena model is derived from the training arena model. With reference to FIG. 1, modeling module 112 derives an operator arena model from the training arena model.

It is noted that the operator arena model is modified and updated continuously according to the updated training arena model. It is further noted that in case the training system is a central system (i.e., and not a distributed system), it produces a respective operator arena model for each trainee operator.

In procedure 206, a representation of the operator arena model is produced. The representation of the operator arena model is the representation of the data of the operator arena model as would be presented to the trainee operator via the output interfaces of the host vehicle if the virtual entities were real. For example, the representation includes the outputted RADAR image on the RADAR display, the played radio communications (i.e., whether received by the radio communication system or simulatively produced by the training system), the image projected onto the visor of the helmet (e.g., depending on the LOS of the operator helmet), and the tactile output of the stick. The representation incorporates the virtual entities into the systems of the host vehicle, as if they are real entities. In this manner, the training arena including the virtual entities is presented to the trainee operator, for training the trainee operator. With reference to FIG. 1, representation model 114 produces a representation of the operator arena model.

In procedure 208, the representation of the operator arena model is presented to the trainee operator. The representation is incorporated into the service systems of the host aircraft for presenting it to the trainee operator. The representation is either directly affecting the output of the service systems (e.g., display screens, helmet visor, speakers and headphones), or is passed from the service systems to subsequent systems (e.g., an altimeter input provided to the INS). Methods for incorporating the representation of the operator arena model into the service systems of the host vehicle are detailed further herein below with reference to FIGS. 3 and 4.

In addition dedicated presentation systems can be employed for presenting the representation of the operator arena model directly to the operator and not via the output interfaces of the service systems, such as projectors for projecting an image on the cockpit window of a host aircraft. These additionally dedicated presentation systems are employed for presenting the portions of the operator arena model which could have been perceivable to the operator when surveying the environment by, for example, looking through the cockpit windows or listening to external sounds (i.e., which naturally is less relevant in case the host vehicle is a host jet aircraft being a noisy machine preventing any external noises from being heard by the pilot).

The virtual entities are presented to the trainee operator of the host vehicle, through the output interfaces, as if they were real entities. Thus for example, a cluster of virtual entities or of a combined cluster of virtual and real entities at a far distance from the host aircraft are presented as a single entity. When the host aircraft is sufficiently close to the cluster, the cluster representation is separated into a group of separate representations of each of the entities. In case a real entity would be presented as distorted due to weather conditions, a virtual entity simulating that real entity would be presented similarly distorted.

The training system can produce communications (e.g., radio communications) of a virtual entity as if originating from a real entity. The training system can inject the simulating radio communications into the radio communications system thereby playing them to the trainee operator and broadcasting them to the real entities which share the radio network with the host vehicle. Alternatively, the training system can play the simulating radio communications to the trainee operator as if they are real radio communications (e.g., via the speakers or headphones of the radio communication system), and provide data respective of the radio communications to other training systems via the data link. For example, the managing processor of the training system produces radio communications of a virtual formation member as if it was sent from a real formation member, and injects it into the radio system of the host aircraft, thereby outputting it to the trainee pilot and to real entities sharing the radio network.

In procedure 210, data respective of the virtual entities is provided to the real entities. The virtual entities data is provided to the real entities so that the real entities could interact with the virtual entities. In this manner, the virtual entities are incorporated into the training arena, and are simulating real entities. With reference to FIG. 1, training system 100 provides data respective of the virtual entities to real entities 122, and real entities 122 interact with the virtual entities. It is noted that in a distributed configuration of the training system, each host vehicle is considered as a real entity for the other host vehicles, and thus each training system updates the other training systems about the virtual entities it manages. In the central configuration of the training system, the central processor provides to each host vehicle the virtual entities data relevant thereto.

With reference to FIG. 2B, procedure 216 involves receiving virtual entities data for updating the training arena model. The virtual entities data is produced by the training arena management system. The training system manages each of the virtual entities separately, and does this for all of the virtual entities simultaneously. It is noted that in the central configuration of the training system, the central training system manages the virtual entities and updates the training arena model. in the distributed configuration each training system can be responsible for managing other virtual entities, and each training system updates the other training systems about the virtual entities it manages such that all training systems can maintain an updated training arena model (i.e., the training systems share the training arena model, but maintain different derived arena models for the respective host vehicles).

Procedure 216 includes three sub-procedures 220, 222, and 224, which detail the method for managing a selected virtual entity and generating data detailing that virtual entity. These sub-procedures are followed (i.e., performed) for each virtual entity managed by the training system.

In procedure 220, other virtual entities data detailing other ones of the virtual entities is received and the training arena model is updated accordingly. As mentioned above, the training system manages each virtual entity separately. Thus, for managing the selected virtual entity, the training system employs the training arena model including data detailing the other virtual entities (as well as data detailing the real entities, the host vehicle, the physical environment, and the like). For updating the training arena model, the training system receives data about all the virtual entities except for the selected virtual entity which behavior is currently to be determined. That data about all other virtual entities is referred to herein as other virtual entities data.

The other virtual entities data can be received from the training system itself, in case it manages the other virtual entities or at least some of them, and can be received from other training systems (e.g., colleague training systems or a central training system). With reference to FIG. 1, for managing a selected virtual entity, managing processor 102 receives data detailing the other virtual entities.

In procedure 222, a virtual entity arena model, detailing the training arena as would have been detected and as could have been perceived by the virtual entity were the virtual entities were real, is derived from the training arena model. For the selected virtual entity, a respective virtual entity arena model is derived from the training arena model. The virtual entity arena model represents the training arena from the perspective of the virtual entity. In particular, the virtual entity arena model describes the training arena as would have been detected by the service systems of the selected virtual entity, and as could have been perceived by an operator of the selected virtual entity (i.e., in case of a manned virtual entity) in case the virtual entity and all other virtual entities were real entities.

For example, in case a real entity playing a foe aircraft locks its FCR on a virtual entity, the managing processor increases the RADAR cross section of the locking real entity as detected by the virtual entity. Thus, the virtual entity arena model would include the increased RADAR cross section of the locking entity. Similarly, in case the virtual entity detects a cluster of entities (i.e., virtual or real, including the host vehicle, or a combination of both) from a large distance, at first the cluster is detected as a single entity, and only at a closer range, or at a higher resolution scan, the cluster is revealed as a formation of several aircrafts. With reference to FIG. 1, modeling module 112 derives a virtual entity arena model from the training arena model.

In procedure 224, the virtual entity is managed according to the virtual entity arena model for simulating a real entity. Virtual entity data detailing the virtual entity is generated, and the training arena model is updated accordingly. Each virtual entity is managed according to its own virtual entity arena model, so that it would simulate a real entity reacting to the training arena as it perceives it. In this manner, the virtual entities are simulating real entities which are limited by what they perceive of the training arena (and what is hidden from them). Thus, for example, a virtual entity might be blinded by sun rays, or its RADAR systems may be jammed, so it would not detect an approaching entity, and would be surprised thereby. As another example, a virtual entity which is locked on, and therefore the RADAR cross section of the locking entity is increased, could react by evasive maneuvers. Additionally, the virtual entity reports data which would have been detected by its service system if it and all other entities were real, via the data link as a real entity would have (i.e., the training system simulates such reports).

When the training system determines the behavior of the virtual entity (i.e., manages the virtual entity), it generates data describing the behavior of the virtual entity, and updates the training arena model accordingly. The training system employs the updated training arena model for deriving updated virtual entities models for the other managed virtual entities, and for managing them accordingly. In other words, the training system performs the procedures of FIG. 2B for each of the virtual entities it manages. Thus, for each virtual entity, the training system derives a respective arena model from an updated training arena model (including data about the other virtual entities), determines its behavior according to the respective arena model and updates the general training arena model accordingly. With reference to FIG. 1, processor 102 manages the virtual entity, and generates virtual entity data. Modeling module 112 receives the virtual entity data and accordingly updates the training arena model.

Figure 3:
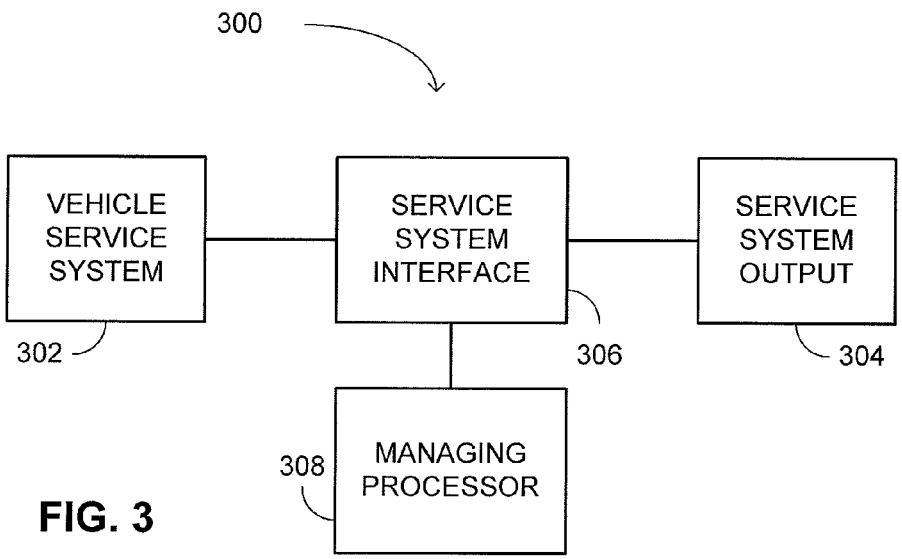
FIG. 3 is a schematic illustration of a service system interface assembly, constructed and operative in accordance with a further embodiment of the disclosed technique.
Figure 4:
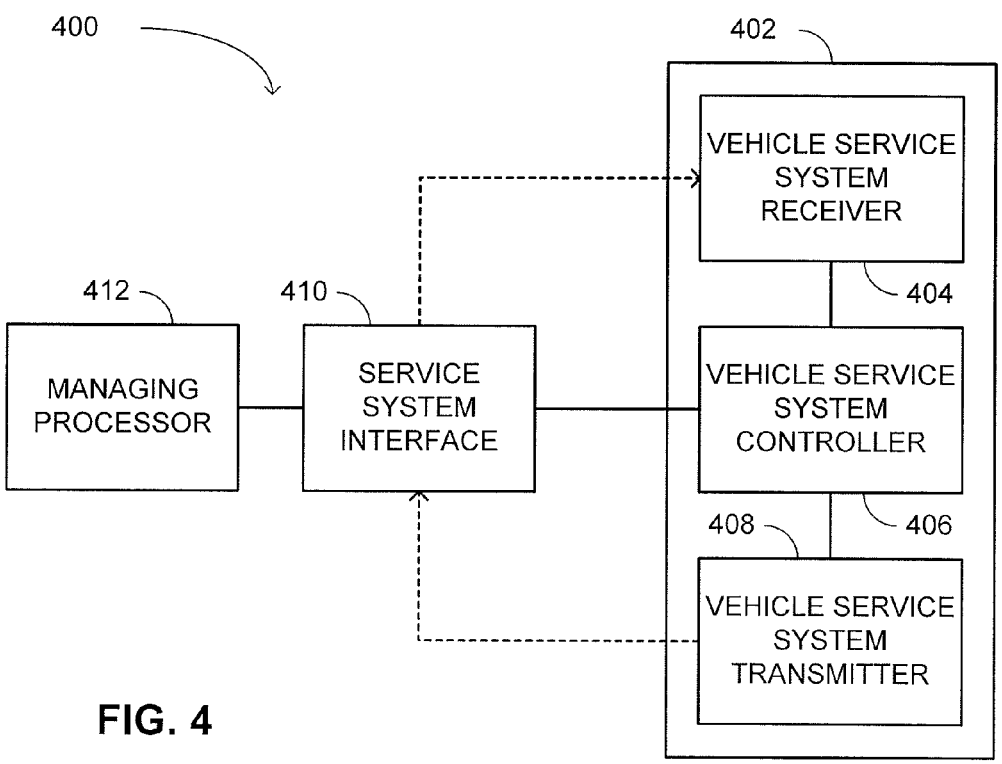
FIG. 4 is a schematic illustration of a service system interface assembly, constructed and operative in accordance with yet another embodiment of the disclosed technique.

As mentioned above, the training system produces a representation of the operator arena model and incorporates it into the service systems for the host vehicle. FIGS. 3 and 4, herein below describe methods for incorporating the representation into the service systems. Reference is now made to FIG. 3, which is a schematic illustration of a service system interface assembly, generally referenced 300, constructed and operative in accordance with a further embodiment of the disclosed technique. Service system interface assembly 300 includes a host vehicle service system 302, a service system output 304, a service system interface 306, and a training system managing processor 308. As mentioned above, the host vehicle in the examples set forth in FIGS. 1-4, is a host aircraft. Alternatively, the vehicle can be any vehicle whether ground vehicle, marine or airborne vehicle.

Service system 302 can be any one of the service systems of the host vehicle which outputs data either to the trainee operator, or to a subsequent system, such as the EW systems such as the Radar Warning Receiver (RWR) system and the Missile Warning System (MWS), the IFF interrogator, the weapons systems, the surveillance pod, the helmet system, an altimeter, the INS, and the like. Service system 302 receives input data (e.g., returning RADAR signals) and accordingly produces an output (e.g., a RADAR image), to be outputted via output 304 (e.g., a RADAR display or a data line providing data to a subsequent system).

For example, output interface 304 is a RADAR display, which receives from RADAR 302 data respective of detected objects and displays the detected objects to the trainee operator. It is noted that vehicle service system 302 and service system output 304 are native systems of the host vehicle, which are not modified by the systems and methods of the disclosed technique.

Service system interface 306 includes a data tap and an interface controller (both not shown). The data tap is coupled between service system 302 and service system output 304 for tapping into the link between service system 302 and output 304, thereby gathering service system data running between service system 302 and output 304 and injecting simulative service system data received from the training system to output 304. The interface controller receives the service system data from the data tap and translates it to the data format employed by managing processor 308 for managing the training arena and the virtual entities. That is, the interface controller translates the service system data into training arena data (or extracts training arena data from the service system data).

The data tap of service system interface 306 is tailored to the communication link between service system 302 and output 304. The interface controller can be physically located with the data tap, or can be remotely located at the training arena management system as a separate module or as a sub-module of managing processor 308.

Managing processor 308 employs the training arena data for updating the training arena model and produces updated representation of operator arena model for service system 302. Processor 308 provides the updated representation to interface 306. As mentioned above, the updated representation is produced by processor 308 such that the virtual entities are presented as real entities. For instance, in case that in a FLIR image, real vehicles appear in a specific intensity, virtual vehicles would appear in the same specific intensity, similarly to the real vehicles. That is, managing processor 308 employs image processing techniques for manipulating the output image such that the virtual entities are presented as similar to the real entities.

The interface controller of interface 306 translates the representation into simulative service system output and sends it to output 304. Thereby, the training system manages the training arena and the virtual entities according to data received from a plurality of service systems, and injects the representation of the operator arena model including the virtual entities into the different native service systems without modifying the structure of service system 302 or output 304, only the outputted data.

As mentioned above, In the example set forth in FIG. 3, the service system data running between service system 302 and output 304 relate to service system output (e.g., RADAR image) for the trainee operator, or for a subsequent system. The representation of the operator arena model as provided by managing processor 308 might require modifying the outputted data of the service system 302. For example, in case that there is an aircraft on the one side of the host aircraft, and another aircraft approaches from the opposite side, the RADAR might miss the approaching aircraft and it would not show on the RADAR output. Assuming that the first aircraft is a virtual entity and that the approaching aircraft is a real one, managing processor 308 would have to change the RADAR output for eliminating the detected real aircraft and introduce the virtual aircraft which was "detected" in the training session. Therefore, the data tap of interface 306 diverts the data sent from service system 302 to service system output 304 toward the interface controller, and replaces it with appropriate output produced by the training system and including the virtual entities.

As mentioned above, service system interface 306 enables managing processor 308 to gather data from service system 302 for better managing the training arena. In addition service system interface 306 enables the training system to inject the representation of the operator arena model including the virtual entities into the training environment as presented to the trainee operator by the output interfaces of the host vehicle. The training system and method of the disclosed technique gather and inject data without modifying the structure of the native service systems and output interfaces of the host vehicle, thereby enabling the trainee operator to train at operating the native service systems of the host vehicle.

Reference is now made to FIG. 4, which is a schematic illustration of service system interface assembly, generally referenced 400, constructed and operative in accordance with yet another embodiment of the disclosed technique. Interface assembly 400 is a service system interface assembly, which incorporates the representation of the operator arena model data into the respective service system via the input of the service system. Interface assembly 400 can be modified to suit any service system of the host aircraft which includes a receiver. That is, any service system which receives signals and interprets them, or acts according to them, such as a RADAR system, a radio communication system, IFF interrogator, EW systems, and the like.

Interface assembly 400 includes a service system 402, a service system interface 410 and a managing processor 412. Service system 402 includes a receiver 404, a controller 406, and may further include a transmitter 408 (i.e., the transmitter is optional). Service system 400 further includes an output interface (not shown) to the operator or to a subsequent system. The service system outputted data is produced by controller 406 and is provided to the service system output interface.

Service system interface 410 is coupled with managing processor 412. Service system interface 410 is further coupled with service system controller 406 and is in communication with service system receiver 404 and transmitter 408. That is, service system interface 410 can transmit to receiver 404 and receive transmissions from transmitter 408 (or at least can monitor the operation of transmitted 408, such as determining the direction of a RADAR antenna).

Service system 400 transmits a transmitted signal via transmitter 408 and receives an input signal via receiver 404. For example, the transmitted signal can be a RADAR pulse or a radio communication signal and the received input signal can be the returned portion of the transmitted RADAR pulse, or an incoming radio communication signal. Accordingly controller 406 produces output data (e.g., a RADAR image). Alternatively, service system transmits no signal and simply processes input signals (i.e., and accordingly produces output data).

Interface 410 includes a data tap and an interface controller (both not shown). The data tap receives the transmitted signals transmitted by transmitter 408, and provides input signals to receiver 404 (e.g., the data tap is a transceiver antenna which can transmit and receive RADAR pulses). The interface controller translates the transmitted signals gathered by the data tap into training data for managing processor 412. Alternatively, the data tap does not receive the transmissions of transmitter 408, and only determines operational characteristics of transmitter 408, such as the direction of a RADAR antenna. Thereby, the training system can produce an appropriate input signal for injecting to service system 402 (e.g., the entities which would have been detected when the RADAR antenna was directed to a specific direction, in case all entities were real).

The interface controller also receives from managing processor 412 representation data respective of an input signal for injecting into service system 402, and translates this representation data into a service system input signal to be sent to receiver 404 by the data tap. For example, a RADAR transceiver serves as the interface data tap.

Receiver 404 receives the representation input signal, and may further receive real input signals from real entities in the vicinity of the host aircraft. Controller 406 receives the representation and the real input signals, processes the input signals, and accordingly prepares a service system output for presenting to the trainee operator via the output interface of service system 402, or for providing to a subsequent system.

Injection assembly 400 incorporates the representation of the operator training arena to the input of the service system of the host aircraft, as opposed to the injection assembly of FIG. 3, which incorporates the representation of the operator training arena to the output interface of the host aircraft. Thus, when receiving the representation data signal from injection assembly 400, the RADAR of the host aircraft processes the representation data signal similarly to any real incoming RADAR signal, and presents the respective output to the trainee pilot.

As mentioned above, with reference to FIG. 3, a data tap of a training system interface has two functions. The first function of the data tap is gathering training data from the respective service system for updating the training arena model. The second function is gathering data from the service system for determining how to produce the representation of the operator arena model, such that it would be perceived as real, and incorporating the representation of the operator arena model into the service system itself.

Both functions are performed by service system interface 410. Service system interface 410, which is directly coupled with controller 406, receives therefrom the output produced by controller 406 to be outputted by the service system output interface. Thereby, interface 410 receives the data gathered by the service system and provides it to managing processor 412 for updating the training arena model. Additionally, service system interface 410 receives the transmissions of transmitter 408 (i.e., or monitors the operation of transmitter 408, such as the direction of the RADAR antenna) for enabling appropriate virtual entities injection. Additionally, service system interface 410 performs the injection itself by providing input signals to receiver 404.

Alternatively, operator arena representation data is provided to controller 406 directly, and not via receiver 404. Thus, controller 406 is "aware" of the difference between the input received from receiver 404 and the input received from the training system, and incorporates the operator arena representation into its output.

Following is a description of a training scenario for training a trainee pilot as a formation leader. By employing the training arena management system of the disclosed technique, the trainee pilot can be trained to be a formation leader by augmenting the real aircrafts flying along the trainee pilot, with virtual entities, thereby improving the level and complexity of the training session, without the costs incurred by employing numerous aircrafts and other units. The trainee pilot can command a formation of virtual entities and simulate a mission in which the formation encounters virtual foe aircrafts.

For instance, the trainee pilot is simulated commanding a formation of four aircrafts, two of which are virtual entities. The simulated mission is an air superiority mission, and the formation of the trainee formation leader is confronted with a formation of four hostile (i.e., foe) aircrafts. The virtual entities simulating subordinate formation members would follow similar procedures as the trainee pilot, as they simulate real human pilots of the same air force.

It is noted that, a pilot can normally see the other aircrafts in the formation. In case, the formation members are virtual, the trainee pilot would only perceive the virtual formation members via the systems of the host aircraft (e.g., RADAR system, radio communication system, and the like). In case of virtual foe aircrafts, the problem is less acute, as a pilot does not necessarily view foe aircrafts in operational situations as well. The visual perception of virtual entities can be solved by employing a projection system for projecting a scenery onto the visor of the trainee pilot or onto the cockpit windows. The projection system is coupled with the managing processor of the training system, for receiving appropriate video signal for projecting to the trainee pilot.

The virtual entities would interact with the host aircraft and with the other entities (i.e., whether real or virtual). In the example, of the formation leader training, the virtual entities simulating formation members of the trainee formation leader pilot would react to voice commands given by the trainee pilot over the radio communication system. That is, the trainee pilot communicates with its formation subordinate members via the radio communication system of the host aircraft, as if the virtual formation members were real.

In addition, the virtual formation member reacts to the actions of the trainee formation leader. For example, in case the trainee pilot is trained as a formation leader, when the trainee pilot turns its aircraft, both the real and the virtual formation members react to this maneuver and follow the trainee pilot (i.e., follow the formation leader).

Furthermore, the virtual entities react to the actions of other entities (both real and virtual). For example, in case one of the simulated foe aircraft locks its RADAR onto a simulated formation member (i.e., a virtual entity simulating a formation member), the simulated formation member can perform evasive maneuvers or actions. Additionally, the simulated foe aircraft (i.e., which is locking its RADAR on the simulated formation member) would appear as more prominent on the RADAR of the host aircraft because its RADAR cross section increases, due to the RADAR lock. The simulated formation member, on whom the simulated foe is locked, can notify its formation members (i.e., the host aircraft and the real formation members) via the radio communication system that it was locked on. Thus, the trainee pilot and the other formation members, both real and virtual, can also respond to the locking of the foe aircraft on the virtual formation member.

It will be appreciated by persons skilled in the art that the disclosed technique is not limited to what has been particularly shown and described hereinabove. Rather the scope of the disclosed technique is defined only by the claims, which follow.

The invention claimed is:

1. A method for managing a training arena for training an operator of a host vehicle, the method comprising the procedures of:
  gathering data by a plurality of native service systems of said host vehicle;
  generating a training arena data model, the training arena model describing a plurality of virtual entities within said training arena that are managed by a training system, and describing said host vehicle, said training arena model being generated at least according to pre-determined training arena data according to the data gathered by said plurality of native service systems of said host vehicle;
  for each selected one of said plurality of virtual entities:
    deriving a portion of said training arena data model that describes said training arena as would have been detected and as could have been perceived from a perspective of said selected virtual entity in case said plurality of virtual entities were real;
    managing said selected virtual entity for simulating a real entity according to said portion of said training arena data model generating selected virtual entity data describing said selected virtual entity, and updating said training arena model according to said selected virtual entity data;
  deriving an operator portion of said training arena data model that describes said training arena as would have been detected by said plurality of native service systems of said host vehicle and as could have been perceived by said trainee operator in case said plurality of virtual entities were real,
  producing a representation of said operator portion; and
  presenting said representation of said operator portion to said operator;
  wherein said service systems of said host vehicle including at least one of the list consisting of:
  radio communication system;
  helmet system;
  inertial navigation system;
  electronic warfare systems;
  fire control RADAR system;
  observing system;
  targeting pod;
  missile system; and
  identification friend or foe interrogator.

2. The method of claim 1, wherein said training arena further includes real entities, and wherein said training arena data model further describes said real entities.

3. The method of claim 2, further comprising the procedure of providing to said real entities data respective of said plurality of virtual entities.

4. The method of claim 1, wherein said service systems of said host vehicle including at least one of the list consisting of:
  radio communication system;
  data link system;
  helmet system;
  inertial navigation system;
  electronic warfare systems;
  fire control RADAR system;
  observing system;
  targeting pod;
  missile system and
  identification friend or foe interrogator.

5. The method of claim 1, wherein said procedure of presenting said representation being performed by the following steps for a selected one of said service systems of said host vehicle:
  intercepting a produced output data of said service system before it reaches a respective output, and
  replacing said produced output data with corresponding with said representation.

6. The method of claim 1, wherein said procedure of presenting said representation being performed by the following steps for a selected one of said service systems of said host vehicle:
  intercepting a produced output data of said service system before it reaches a respective output, and
  modifying said produced output data according to said representation.

7. The method of claim 1, wherein said procedure of presenting said representation being performed for a selected one of said service systems of said host vehicle by inputting training input data into said selected service system corresponding with said representation.

8. The method of claim 7, wherein said training input data is inputted into an input receiver of said selected service system in form of a training input signal.

9. The method of claim 7, wherein said training input data is inputted directly into a controller of said selected service system.

10. The method of claim 2, further comprising a procedure of updating the training arena model according to gathered real time training arena data
  from said native service systems of said host vehicle and
  from service systems of said real entities.

11. The method of claim 10, wherein said physical environment data including at least one of the list consisting of:
  land form data;
  land cover data;
  Digital Terrain Elevation Data (DTED);
  meteorological data;
  sun position;
  visibility conditions; and
  cloud positions.

12. The method of claim 1, further comprising a procedure of receiving training arena data for updating said training arena model from an additional training arena management system.

13. The method of claim 1, wherein said procedures of said method being performed simultaneously and continuously.

14. A system for managing a training arena for training an operator of a host vehicle, the training system comprising:
- a database including pre-determined training arena data and including a training arena data model, the training arena model describing a plurality of virtual entities within said training arena, and describing said host vehicle;
- at least one native service system of said host vehicle configured for gathering data; and
- a managing processor configured for managing a selected virtual entity of said plurality of virtual entities by:
  - deriving a portion of said training arena data model that describes said training arena as would have been detected and as could have been perceived from a perspective of said selected virtual entity in case said plurality of virtual entities were real;
  - managing said selected virtual entity for simulating a real entity according to said portion of said training arena data model generating selected virtual entity data describing said selected virtual entity, and updating said training arena model according to said selected virtual entity data;
  - said managing processor further configured for deriving an operator portion of said training arena data model that describes said training arena as would have been detected by said service systems of said host vehicle and as could have been perceived by said trainee operator in case said plurality of virtual entities were real, producing a representation of said operator portion, presenting said representation of said operator portion to said operator.
- wherein said service systems of said host vehicle including at least one of the list consisting of:
- radio communication system;
- helmet system;
- inertial navigation system;
- electronic warfare systems;
- fire control RADAR system;
- observing system;
- targeting pod;
- missile system; and
- identification friend or foe interrogator.

15. The training system of claim 14, further comprising at least one service-system interface configured for interfacing said training system to a respective one of said at least one native service system of said host vehicle and configured for receiving data gathered by said respective native service system of said host vehicle, each of said at least one service system interface includes a data tap configured for gathering service system data from said respective native service system, and for injecting simulative service system data received from said managing processor into said respective native service system; and an interface controller configured for receiving said service system data and translating said service system data into real time training arena data, and for translating said representation of said operator arena model into simulative service system output for said native service system.

16. The training system of claim 14, further comprising at least one real entity interface for interfacing said training system to a respective real entity within said training arena, each of said at least one real entity interface providing training arena data to and receiving training arena data from a respective real entity.

17. The method of claim 1, further comprising the procedure of producing virtual-service-system data and updating said training-arena data model according to said virtual service system data, wherein said virtual service system data describes data simulatively gathered by a virtual service system of said host vehicle, said virtual service system simulating a real service system.

18. The system of claim 14, wherein said managing processor is further configured for producing virtual-service-system data and updating said training-arena data model according to said virtual service system data, wherein said virtual service system data describes data simulatively gathered by a virtual service system of said host vehicle, said virtual service system simulating a real service system.

19. The method of claim 1, wherein said representation of said operator portion includes images of virtual entities that are located along a line of sight of said operator.

20. The method of claim 1, wherein said data gathered by said service systems of said host vehicle includes data respective of a line of sight of said operator gathered by said helmet system, wherein said representation of said operator portion includes images of virtual entities that are located along said line of sight of said operator, and wherein said images of virtual entities are presented via said helmet system.

* * * * *